(12) United States Patent
Bender

(10) Patent No.: US 7,740,092 B2
(45) Date of Patent: Jun. 22, 2010

(54) METHOD AND APPARATUS FOR POWER ELECTRONICS AND CONTROL OF PLUG-IN HYBRID PROPULSION WITH FAST ENERGY STORAGE

(75) Inventor: Donald Arthur Bender, San Ramon, CA (US)

(73) Assignee: AFS Trinity Power Corporation, Bellevue, WA (US)

( * ) Notice: Subject to any disclaimer, the term of this patent is extended or adjusted under 35 U.S.C. 154(b) by 865 days.

(21) Appl. No.: 11/519,350

(22) Filed: Sep. 12, 2006

(65) Prior Publication Data

US 2007/0068714 A1   Mar. 29, 2007

Related U.S. Application Data

(60) Provisional application No. 60/596,909, filed on Oct. 28, 2005, provisional application No. 60/596,443, filed on Sep. 23, 2005.

(51) Int. Cl.
*B60K 6/28* (2007.10)

(52) U.S. Cl. .................................. 180/65.29; 903/907

(58) Field of Classification Search .............. 180/65.21, 180/65.22, 65.245, 65.29; 320/124, 125, 320/140; 903/907
See application file for complete search history.

(56) References Cited

U.S. PATENT DOCUMENTS

| | | | | |
|---|---|---|---|---|
| 4,119,862 A | | 10/1978 | Gocho | |
| 4,207,512 A | * | 6/1980 | Taylor | 320/123 |
| 5,318,142 A | * | 6/1994 | Bates et al. | 180/65.245 |
| 5,589,743 A | * | 12/1996 | King | 318/139 |
| 5,806,617 A | * | 9/1998 | Yamaguchi | 180/65.235 |
| 6,081,096 A | * | 6/2000 | Barkat et al. | 320/124 |
| 6,102,144 A | | 8/2000 | Lutz | |
| 6,223,106 B1 | | 4/2001 | Yano et al. | |
| 6,370,050 B1 | | 4/2002 | Peng et al. | |
| 6,794,846 B2 | * | 9/2004 | Tsuji | 320/103 |
| 6,794,847 B2 | * | 9/2004 | Hosoda et al. | 320/104 |
| 7,099,756 B2 | * | 8/2006 | Sato | 180/65.245 |
| 2001/0040060 A1 | * | 11/2001 | Morimoto et al. | 180/65.3 |

FOREIGN PATENT DOCUMENTS

JP    2000-278808    * 10/2000

* cited by examiner

*Primary Examiner*—Frank B Vanaman
(74) *Attorney, Agent, or Firm*—Morgan, Lewis & Bockius LLP

(57) ABSTRACT

A plug-in hybrid propulsion system includes a fast energy storage device that preserves battery life, where the energy storage elements of the hybrid drive train may be charged with externally supplied electricity as well as energy from the engine or regenerative braking. Electronic switches, passive electronics, an enclosure, controller circuitry, and/or control algorithms are used to manage the flow of power between a fuel powered engine, a battery, a fast energy storage system, traction motors; a charger, ancillary systems, an electrical distribution system, and/or a drive train.

17 Claims, 11 Drawing Sheets

METHOD AND APPARATUS FOR POWER ELECTRONICS AND CONTROL OF PLUG-IN HYBRID PROPULSION WITH FAST ENERGY STORAGE

CROSS-REFERENCE TO RELATED APPLICATIONS

This application claims priority to U.S. provisional application No. 60/596,443, entitled Power Converter and Controller for Plug-in Hybrid Propulsion with Fast Energy Storage, filed on Sep. 23, 2005; and to U.S. provisional application No. 60/596,909, entitled Method and Control for Plug-In Hybrid Propulsion with Fast Energy Storage, filed on Oct. 28, 2005.

FIELD OF THE INVENTION

This invention relates to plug-in hybrid propulsion systems for cars, trucks, and buses where the energy storage element of the hybrid drive train may be charged with externally supplied electricity as well as energy from the engine or regenerative braking.

RELATED ART

Existing products commonly found in the marketplace include conventional hybrid vehicles such as the Toyota Prius, Honda Insight, and Ford Escape Hybrid. More closely related to the present invention are prototype Daimler Chrysler Sprinter plug-in hybrid vans.

The main problem with existing conventional hybrids is that the full potential of conventional hybrid propulsion is not realized due to limited all-electric travel range. This problem is addressed by increasing the energy storage capacity of the vehicle to allow for greater all-electric range. The energy storage system may be charged from an external supply to offset and reduce fuel consumption. This type of propulsion system is known as a plug-in hybrid.

The main problems with existing plug-in hybrid vehicles are the cost of batteries and limited battery life. While conventional hybrid propulsion sized for a car uses energy storage with a capacity of about 1 kWh, plug-in hybrid cars require energy storage exceeding 5 kWh.

The plug-in hybrid battery system must be deeply cycled in order to obtain useful all-electric range within a reasonable physical weight and volume. Deep cycling reduces battery life. The plug-in hybrid battery is much larger and proportionately more expensive than the battery in a conventional hybrid vehicle. Therefore, the cost penalty associated with a plug-in hybrid is more severe than for a conventional hybrid.

An additional problem with batteries used for hybrid vehicles is that maximizing available energy storage requires constraining such environmental conditions of the batteries as temperature. Conditioning of the environment of the battery is required to attain tolerable durability.

BRIEF SUMMARY OF THE INVENTION

The invention is a hybrid electric vehicle powertrain comprising an internal combustion engine; a first electric motor-generator connected to the engine and used to start the engine or supply electricity to the second motor-generator; a second electric motor generator that supplies traction power to the vehicle wheels, a first electrical energy storage device, a second electrical energy storage device, a power electronics system, a control system, and a charging system.

In broad terms, a plug-in hybrid propulsion system comprises a battery pack, an engine, a transmission, power electronics, and controls. More specifically, the plug-in hybrid disclosed here also includes a fast energy storage device that may be a flywheel, capacitor, or certain type of high power battery. The fast energy storage device performs a number of functions including short, frequent, high intensity charge and discharge functions to preserve the battery so that the battery can provide the average power for driving in electric-only mode. A purpose of the plug-in hybrid drive-train is to yield at least a 200,000 mile durability for a passenger car in ordinary use. One advantage of the plug-in hybrid is a reduced number of charge discharge cycles of the battery with correspondingly increased battery life.

The apparatus of the invention is a power converter and controller for a plug-in hybrid propulsion system with a battery and a fast energy storage system.

The power converter and controller comprises (contains at least) motor drives, DC-DC converters, 12 V or 42 V DC supply, and a charging circuit which may have bi-directional power handling capability. These system elements are built using passive components and electronic switches connected to a DC bus.

The power converter and controller also includes controller electronics based on a digital signal processor or microprocessor and related electronic hardware such as gate drive electronics and signal conditioning for sensor input. The controller implements algorithms to manage the performance of the vehicle and the state of the subsystems.

The power converter manages the flow of power between connected devices that include motor/generators, batteries, fast energy storage devices such as flywheels and capacitors, a charging system preferentially with V2G capability, and a power supply to other systems within the vehicle.

One of three devices can be used for fast energy storage. A flywheel apparatus comprises a rotor, a motor-generator, bearings, a housing, a power converter and controller, and ancillary subsystems. A super-capacitor bank comprises a series parallel circuit of electrostatic energy storage components. A high discharge rate battery may also be used although the flywheel and the super-capacitor are preferred.

In use, a preferred embodiment of the invention places all switches, components, and the controller within a single enclosure. The DC bus is located entirely within the enclosure and uses a single bus capacitor. In effect, several power converters and motor drives would be built in a single compact assembly.

An alternate embodiment of the invention would use two housings where the main power handling components were located in a larger enclosure and a smaller enclosure would be used for the controller electronics.

The controller may use one or more digital signal processors or microprocessors in order to host and execute control algorithms.

An advantage of the invention is that the resulting package is very compact and inexpensive compared to discrete drive units. Costly and space consuming interconnections are eliminated.

A second advantage of the invention is that radiated EMI is more readily contained.

An additional advantage of the invention is that subsystems such as liquid cooling can be shared, simplifying integration into a vehicle.

An additional advantage of the invention is that a single controller can implement an n-phase drive where the number of phases, n, may exceed 18.

The invention enables integration of electrochemical, electrostatic, and electrokinetic storage technology. The apparatus and its function have application in a wide range of vehicles as well as distributed energy systems.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the inventive concept. Thus, the following drawings and description are to be regarded as illustrative in nature and not restrictive.

The method of the invention is a method of controlling the flow of energy within a plug-in hybrid vehicle with a battery and a fast energy storage system. The method applies to hybrid vehicles that use more than one type of energy storage device.

The relevant hybrid configuration includes an engine that drives a generator to produce electricity, one or more traction motors, a battery, and a fast energy storage device such as a capacitor or a flywheel. A variety of ancillary loads may also be present. Power converters manage the flow of electrical energy between the source or sources, loads, and energy storage devices. The power converters comprise H-bridge motor drives connected to the generator and traction motors and DC-DC converters connected to the fast energy storage system and the battery. All of the power converters exchange energy through a common DC bus.

There are several objectives of the control strategy disclosed here.

Provide current required by the traction motor(s) and other loads.

Sink energy produced by the traction motor(s) during regenerative braking.

Protect the battery from excessive current.

Protect the battery from operation at excessively high or low states of charge.

Minimize operation of the engine.

Use efficient operation of the engine when it is running.

Recharge the battery using efficient engine operation.

The vehicle will have a number of states. Several parked states include off, charging from the grid, and parked with accessories turned on. The two main operating states are operation in electric vehicle (EV) mode and operation in charging mode (CM) during which the engine, in addition to or instead of supplying traction power, is used to increase the state of charge of the battery. One aspect of the invention is a control strategy that the vehicle uses to determine the when to transition between EV state and CM state. The invention is a method of control that applies primarily to operation in the EV and CM states and to the transition between these states.

The traction motors and ancillary load draw or deposit current from or into the DC bus. The engine, battery, and fast energy storage system are operated to source or sink this energy on demand while satisfying the various requirements. Two methods of control are disclosed. The first method of control involves regulation of the voltage of the DC bus. The second method of control involves regulating current from several devices and subsystems.

One way of implementing the first method of control is to use a power converter in conjunction with the battery so that the battery maintains bus voltage when current demands fall within allowable limits for the battery. When battery discharge current limits are exceeded, voltage will drop and the fast energy storage system will regulate bus voltage. Conversely, when battery charging current limits are exceeded, bus voltage will rise and the fast energy storage system will absorb energy in order to regulate bus voltage.

During discharge, if the current demand exceeds the combined capability of the battery and the fast energy storage system, or if the fast energy storage system is depleted, bus voltage will drop further. Under this condition, the engine will be started in order to supply the DC bus with electricity from the generator.

During regenerative charging, such as during a long hill descent, if the deposited current exceeds the combined capacity of the battery and the fast energy storage system, or if the battery and fast energy storage system become fully charged, then additional regenerative energy may be directed to the engine where it will be absorbed through engine braking.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the inventive concept. Thus, the following drawings and description are to be regarded as illustrative in nature and not restrictive.

BRIEF DESCRIPTION OF THE DRAWINGS

The features of the invention will be better understood by reference to the accompanying drawings that illustrate presently preferred embodiments of the invention. In the drawings.

Figure 1:
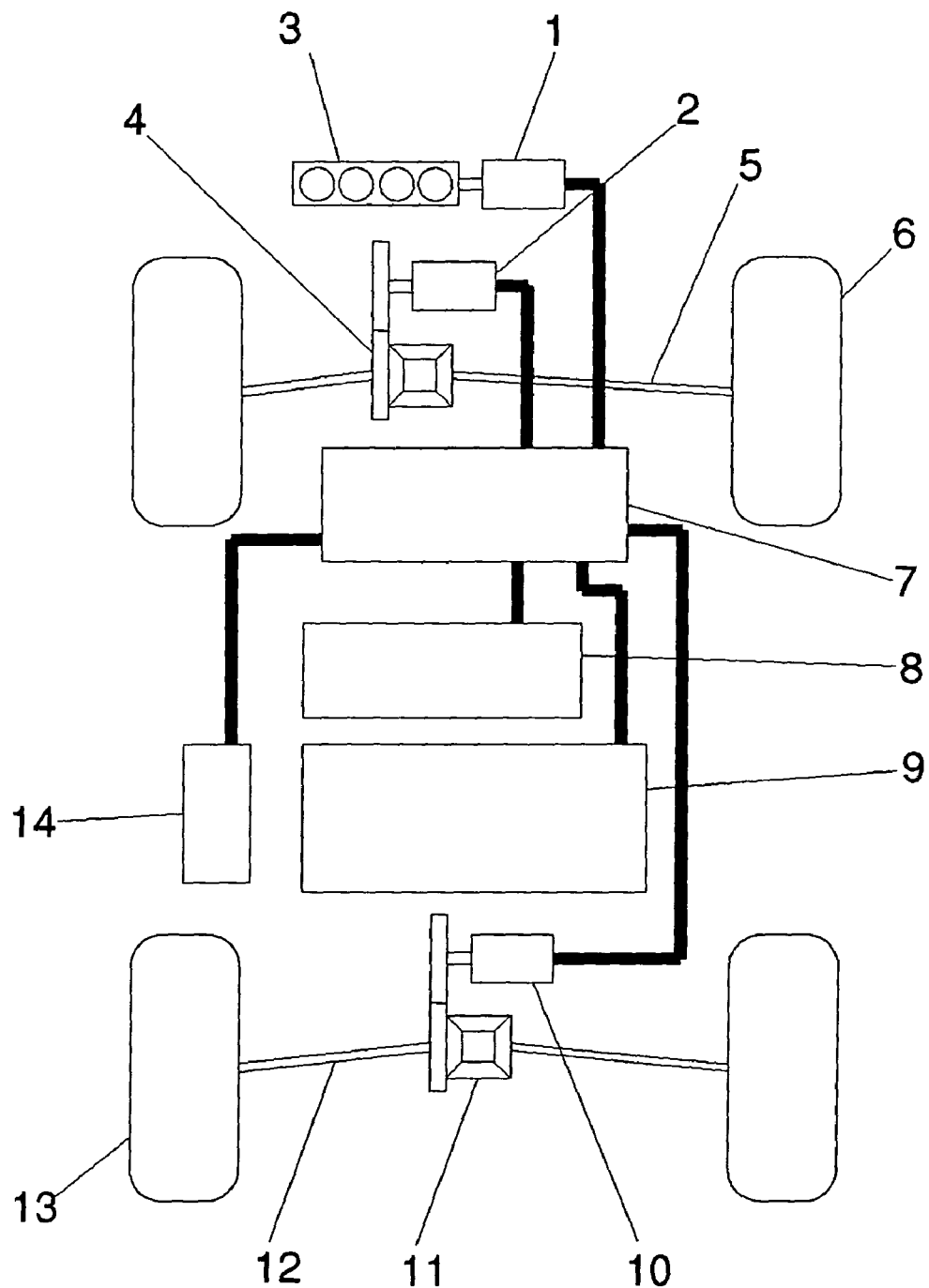
FIG. 1 is a drawing of the plug-in hybrid system.
Figure 2:
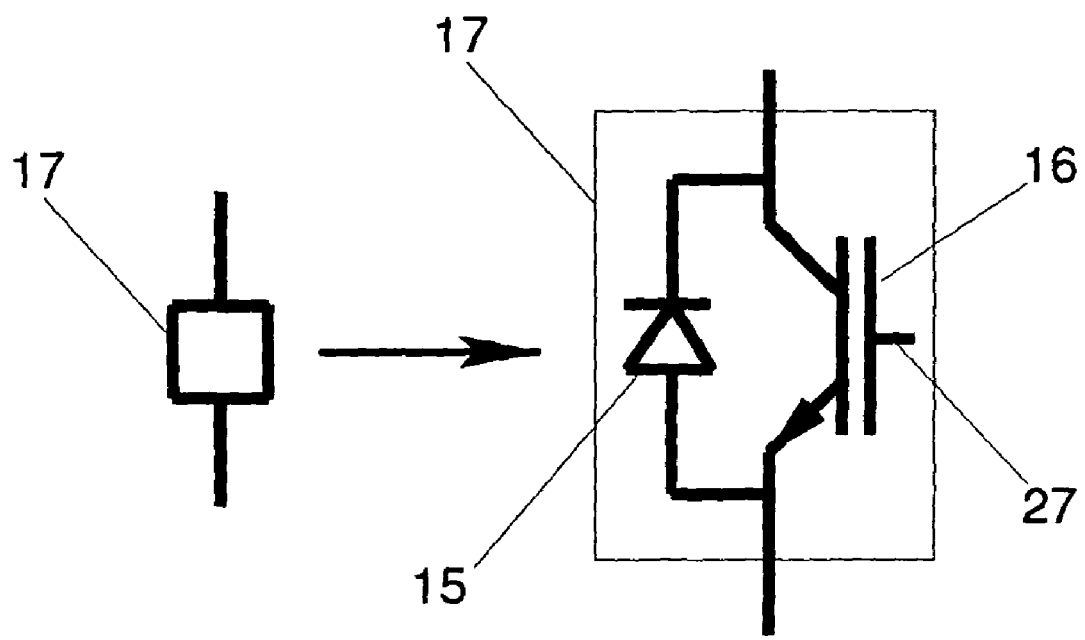
FIG. 2 is a drawing of an electronic switch assembly.
Figure 3:
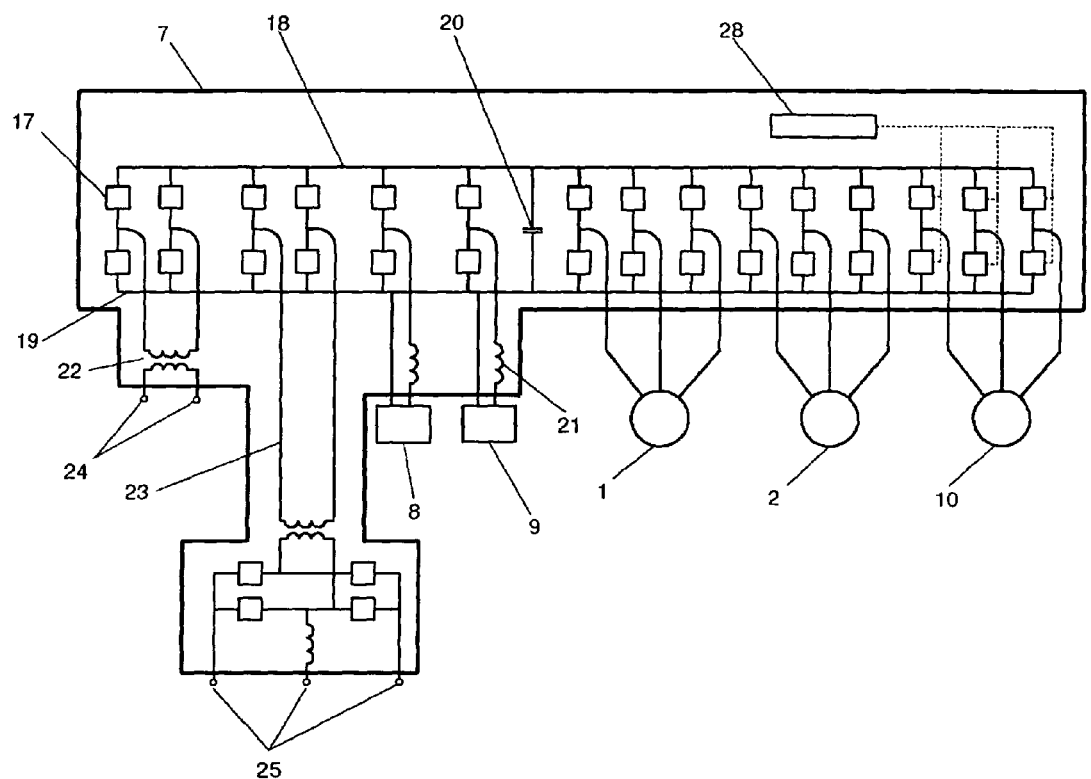
FIG. 3 is a schematic drawing of the power converter and controller and attached devices for a system using three motor/generators and a capacitor fast energy storage system.
Figure 4:
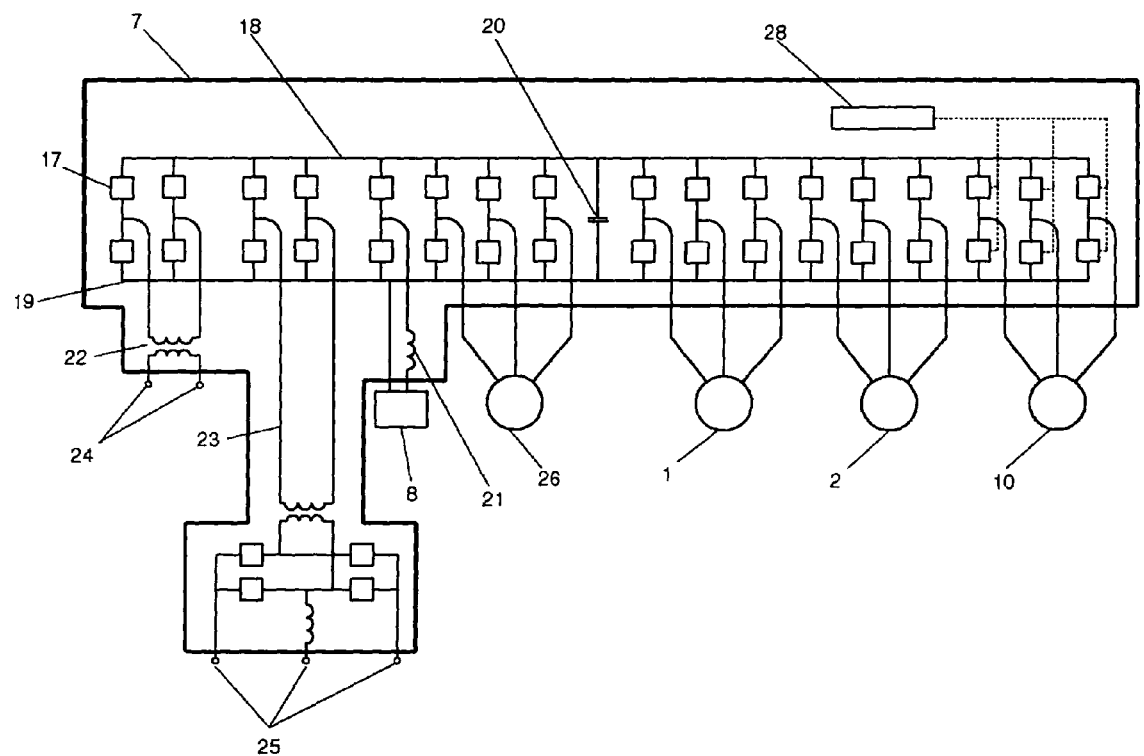
FIG. 4 is a schematic drawing of the power converter and controller and attached devices for a system using three motor/generators and a flywheel fast energy storage system.

The following reference numerals are used to indicate the parts and environment of the invention on the drawings:

In FIG. 1:
1 first motor/generator (MG1)
2 second motor/generator (MG2)
3 engine
4 front differential
5 front axle or split shaft
6 front wheel
7 power converter and controller 8 battery
9 fast energy storage capacitor
10 rear motor/generator (MGR)
11 rear differential
12 rear axle or split shaft
13 rear wheel
14 charger
Additionally, in FIG. 2:
15 diode
16 insulated gate bipolar transistor (IGBT)
17 switch module
27 gate drive
Additionally, in FIG. 3:
18 DC bus
19 DC bus common
20 DC bus capacitor
21 inductor
22 transformer
23 AC link
24 charger input/output
25 DC supply
28 controller
Additionally, in FIG. 4:
26 flywheel fast energy storage

DETAILED DESCRIPTION OF THE DISCLOSURE

Referring to FIGS. 1-11, a preferred embodiment of the invention is disclosed. The power converter and controller 7 processes, conditions, and directs the flow of power between and among all of the connected devices. These include motors, generators, multiple energy storage device, a charger, and ancillary systems. The power converter and controller 7 sources or sinks DC, single phase AC, and multiple phase AC electricity over a range of voltage and power levels.

FIG. 1 shows a series hybrid propulsion system with front and rear wheel drive. This depiction is illustrative and not restrictive. The method disclosed herein may be applied to parallel and power split hybrids as well. Motive power is produced by the engine 3 that drives the first motor-generator 1. The battery 8 and fast energy storage system 9 store energy electrically. All of these devices are connected to the power electronics and control module 7 that delivers electricity to the front traction motor, MG2 2, and the rear traction motor MGR 10.

In the preferred embodiment, the engine 3 is a small piston engine 3 fueled with gasoline. Alternatively, the engine 3 may be an internal combustion engine 3 fueled with any hydrocarbon fuel such as diesel fuel or natural gas, or hydrogen. The engine 3 is connected directly to the first motor/generator, MG1 1. MG1 1 functions primarily as a generator but may also be used to start the engine 3. All electrical power produced or consumed by MG1 1 is processed by the power converter and controller 7.

The power converter and controller 7 is connected to a battery 8. The battery 8 sources or sinks electrical energy. The power converter and controller is connected to a fast energy storage system 9, 26 which also sources or sinks electrical energy. The battery 8 provides energy that is used to propel the vehicle. The fast energy storage system 9, 26 also propels the vehicle and in particular sources or sinks energy during transient events including starts, deceleration using regenerative braking, acceleration events such as passing, and during changes in engine 3 output. The power converter and controller 7 coordinates the flow of energy into and out of both the battery 8 and the fast energy storage unit 9, 26.

The traction motors, MG2 2 and MGR 10, provide motive power to the front and rear wheels respectively. MG2 2 is connected to the front differential 4 that is connected through the front axle or split shaft 5 to the front wheels 6. MGR 10 is connected to the rear differential 11 that is connected through the rear axle or split shaft 12 to the rear wheels 13. The power converter and controller 7 provide electricity to MG2 2 and MGR 10 in order to propel the vehicle. The power converter and controller 7 can direct the energy to either motor individually or in any combination.

The battery 8 preferentially uses lithium chemistry but may also use NiMH, NiCAD, or Pb:acid. The fast energy storage system 9, 26 may comprise a flywheel or a capacitor. Preferentially, the flywheel uses a high-speed rotor housed in an evacuated chamber and integral electronics to drive the flywheel. Alternatively, the flywheel may be of any type that incorporates a rotor and built in motor/generator so that energy may be stored and retrieved electrically. The capacitor may be of any type that is capable of operating at over 10 kW. This may include super capacitors ultra capacitors and electrolytic capacitors. The fast energy storage 9, 26 may have an energy storage capacity that is considerably smaller than the capacity of the battery 8.

FIGS. 2, 3 and 4 disclose the details of the power converter and controller 7. FIG. 2 shows nomenclature for a switch 17 comprising a diode 15 and a solid-state switching device 16. Preferentially, the solid-state switching device 16 is an insulated gate bipolar transistor (IGBT) although other switching devices may be used. The switch 17 is commanded to open or close through signals from the controller to the gate drive 27.

FIGS. 3 and 4 indicate the controller 28 that issues commands to each switch 17 in the system. For clarity, only a few representative connections are shown. In practice, all switches 17 receive input from the controller 28. Additionally, the controller 28 may receive information from each switch 17 including temperature, state (open or closed), and fault condition (clear, warning, fault).

Each switch 17 is switched open or closed in response to a command from the controller 28. Switching is conducted to energize or disable components or subsystems, for commutation, chopping, or to synthesize an AC waveform. The power ratings of the attached devices vary. The corresponding power ratings of the associated switches 17 may also vary in order to allow minimization of the overall size, weight and cost of the power converter and controller 7.

The power converter and controller 7 has a DC bus with one bus bar 18 at elevated potential and a second bus 19 at a common potential. An H-bridge leg comprises two switches 17 connected in series where the pair of switches 17 connect the two bus bars of the DC bus 18, 19 and the point between the switches connects to one phase leg of the connected AC device.

A DC bus capacitor 20 serves several purposes individually or simultaneously. Mainly, the bus capacitor 20 provides dynamic energy storage necessary for the motor drive and buck-boost functions conducted by the inverter legs. A single DC bus capacitor 20 serves all of the phase legs in the power converter and controller 7.

The power converter and controller 7 sources or sinks power from the motor/generators, 1, 3, 10 flywheel fast energy storage 26, and the charging port 24 in AC format. The H-bridge legs of the power converter and controller can operate as a rectifier, an active rectifier, a motor drive, or an AC inverter in order to interface with these devices.

The H-bridge legs may also function as a chopper, or perform any other power processing accomplished by switching, such as those used for DC-DC conversion. These configurations are used for the interface to the battery 8 and the fast energy storage capacitor 9.

Inductance is required for buck-boost functions and as part of the motor drive circuitry. Motors have non-negligible inductance that may be sufficient for this purpose. For devices with low inherent inductance such as batteries 8 or energy storage capacitors 9, an inductor 21 may be incorporated in the circuit.

For motors MG1 1, MG2 2, MGR 10, and the motor/generator in the flywheel 26, portions of the power converter and controller 7 function as a bi-directional motor drive. Three-phase drive is typical but other numbers of phases may be used as well. FIGS. 3 and 4 show 3-phase drive configurations. To produce torque, a number of control strategies may be implemented including pulse width modulation (PWM), space vector control, and simple commutation.

Buck/boost converters perform DC to DC voltage conversion by using high frequency switching to cause dynamic response in an inductance. A capacitor 20 smoothes out transients associated with the switching frequency of the converter. An inductor 21 or inherent inductance, a capacitor 20, and a switch 17 are required to perform either a buck or boost function. FIGS. 3 and 4 show buck/boost circuits for the battery 8. FIG. 3 shows a buck/boost circuit for the fast energy capacitor 9. In these examples, the use of two switches 17 for each buck/boost stage allows the inductor 21 and the capacitor 20 to be used for either buck or boost operation without reconfiguration.

Buck/boost converters are used for DC-DC conversion for higher power attached devices. An AC link 23 and transformers 22 are used for AC voltage conversion to the charger port 24. An internal AC link 23 is used to allow transformation to a lower voltage so that a separate inverter subassembly can provide lower voltage output (12V, 42V) at the DC supply ports 25.

The charger port 24 is shown as a single-phase system but a 3-phase system may be used as well. When the vehicle is at rest and connected to a utility grid, the charger circuitry may deliver energy to the DC bus 18, 19 and from there to any of the attached devices. During V2G operation, energy from the battery 8, fast energy system 9, 26 or engine 3 via MG1 1 may be delivered to the grid.

The DC output ports 25 are energized by a small active rectifier that operates at a voltage that is different from the voltage of the principal DC bus 18, 19. This active rectifier uses switches 17 of the type used throughout the power converter and controller 7 and communicate with the controller 28. The configuration shown in FIGS. 3 and 4 can source low power DC at two voltages, preferentially 12V and 42V.

The controller 28 directs operation of the power converter by implementing a set of rules. These rules pertain to vehicle state, driver input, operating conditions, vehicle performance, regenerative braking, protection of the battery 8, extending battery 8 life, managing fuel consumption, managing state of charge for the battery 8 and the fast energy storage system 9, 26, charging, V2G functions, and accessory loads. The controller 28 will implement a set of functions that will supply power to the traction motors 2, 10 in response to driver input for acceleration. In response to a command for deceleration, such as coasting or braking, the controller 28 will operate one or both traction motors 2, 10 as generators to slow the vehicle through regenerative braking.

The traction motors drive the front 6 and rear 13 wheels through front 4 and rear 11 differentials, and front 5 and rear 12 driveshafts, respectively. When parked, externally supplied electricity may be delivered through the charger port 14.

FIGS. 3 and 4 present a schematic showing details of the power converter and controller 7. Each switch 17 comprises a diode and a solid-state switching device. Preferentially, the solid-state switching device is an insulated gate bipolar transistor (IGBT) although other switching devices may be used. The switch is commanded to open or close through signals from the controller.

The controller 28 issues commands to each switch 17 in the system. For clarity, only a few representative connections are shown. In practice, all switches 17 receive input from the controller 28. Additionally, the controller 28 may receive information from each switch 17 including temperature, state (open or closed), and fault condition (clear, warning, fault). Switching is conducted to energize or disable components or subsystems, for commutation, chopping, or to synthesize an AC waveform.

The power converter and controller 7 has a DC bus with one bus bar 18 at elevated potential and a second bus 19 at a common potential. An H-bridge leg comprises two switches 17 connected in series where the pair of switches 17 connect the two bus bars of the DC bus 18, 19 and the point between the switches connects to one phase leg of the connected AC device.

A DC bus capacitor 20 serves several purposes individually or simultaneously. Mainly, the bus capacitor 20 provides dynamic energy storage necessary for the motor drive and buck-boost functions conducted by the inverter legs. A single DC bus capacitor 20 serves all of the phase legs in the power converter and controller 7.

The power converter and controller 7 sources or sinks power from the motor/generators, 1, 3, 10 flywheel fast energy storage 26, and the charging port 24 in AC format. The H-bridge legs of the power converter and controller can operate as a rectifier, an active rectifier, a motor drive, or an AC inverter in order to interface with these devices.

The H-bridge legs may also function as a chopper, or perform any other power processing accomplished by switching, such as those used for DC-DC conversion. These configurations are used for the interface to the battery 8 and the fast energy storage capacitor 9.

Inductance is required for buck-boost functions and as part of the motor drive circuitry. Motors have non-negligible inductance that may be sufficient for this purpose. For devices with low inherent inductance such as batteries 8 or energy storage capacitors 9, an inductor 21 may be incorporated in the circuit.

For motors MG1 1, MG2 2, MGR 10, and the motor/generator in the flywheel 26, portions of the power converter and controller 7 function as a bi-directional motor drive. Three-phase drive is typical but other numbers of phases may be used as well. To produce torque, a number of control strategies may be implemented including pulse width modulation (PWM), space vector control, and simple commutation.

Buck/boost converters perform DC to DC voltage conversion by using high frequency switching to cause dynamic response in an inductance. A capacitor 20 smoothes out transients associated with the switching frequency of the converter. An inductor 21 or inherent inductance, a capacitor 20, and a switch 17 are required to perform either a buck or boost function. FIGS. 3 and 4 show buck/boost circuits for the battery 8. FIG. 3 shows a buck/boost circuit for the fast energy capacitor 9. In these examples, the use of two switches 17 for each buck/boost stage allows the inductor 21 and the capacitor 20 to be used for either buck or boost operation without reconfiguration.

Buck/boost converters are used for DC-DC conversion for higher power attached devices. An AC link 23 and transformers 22 are used for AC voltage conversion to the charger port 24. An internal AC link 23 is used to allow transformation to a lower voltage so that a separate inverter subassembly can provide lower voltage output (12V, 42V) at the DC supply ports 25.

The charger port 24 is shown as a single-phase system but a 3-phase system may be used as well. When the vehicle is at rest and connected to a utility grid, the charger circuitry may deliver energy to the DC bus 18, 19 and from there to any of the attached devices. During V2G operation, energy from the battery 8, fast energy system 9 or engine 3 via MG1 1 may be delivered to the grid.

The DC output ports 25 are energized by a small active rectifier that operates at a voltage that is different from the voltage of the principal DC bus 18, 19. This active rectifier uses switches 17 of that communicate with the controller 28. The configuration shown in FIGS. 3 and 4 can source low power DC at two voltages, preferentially 12V and 42V.

Battery 8 state of Charge (SOC) will be maintained within limits established by the controller which will include an upper charge limit in the range of 80%-100% SOC and a lower charge limit of 10%-50% SOC. When battery 8 SOC reaches an upper limit, processes that result in charging will be stopped or transferred to the fast energy storage device 9, 26. When the battery 8 SOC reaches a lower limit, processes that result in battery 8 discharge will be stopped, or the battery 8 will be charged regeneratively, or the engine 8 will be used to charge the battery 8.

When the rate of battery 8 charge or discharge exceeds limits set in the controller 28, the power converter and controller 7 will source or sink energy from the fast energy storage system 9, 26.

When the fast energy storage system 9, 26 reaches an upper or lower charge limit, the controller will direct energy flow to restore fast energy 9, 26 state of charge to a predetermined intermediate level. This process will be executed only if it does not compromise vehicle performance or result in conditions that degrade battery 8 life.

Upon the occurrence of an electrical fault, a number of responses will be implemented depending on the nature of the fault. Examples of the range of possible responses include disconnecting, de-energizing, or isolating a faulted connected device, disabling the controller 28, and manual or automatic resetting and clearing the fault. Many other control strategies will be implemented and all such variations are intended to be within the scope and spirit of the invention.

Operation of the invention involves a number of different driving modes.

In the first mode of operation, the engine 3 supplies motive power to the wheels 6,13 by producing electricity with MG1 1 which is processed by the power converter and controller 7 and delivered to either or both MG2 2 and MGR 10.

The second mode of operation is referred to as EV (electric vehicle) mode. In this mode, all motive power is provided using either or both the battery 8 and the fast energy storage 9, 26. Electrical energy from these devices is processed by the power converter and controller 7 and delivered to either or both MG2 2 and MGR 10 in a combination determined by the power converter and controller 7.

In the third mode of operation, motive power is provided by both the engine 3 and either or both the battery 8 and the fast energy storage system 9, 26. In this mode, electrical energy supplied by any of these devices is processed by the power converter and controller 7 and delivered to either or both MG2 2 and MGR 10 in a combination determined by the power converter and controller 7.

In the fourth mode of operation, during deceleration with regenerative braking, either or both MG2 2 and MGR 10 provide a force to retard the vehicle by acting as generators. The energy produced under these conditions is processed by the power converter and controller 7 which may direct the energy to be stored in the battery 8, be stored in the fast energy storage system 9, or be delivered to MG1 1 so that MG1 1 could exert a torque on the engine 3 whereby the engine 3 would perform engine braking. The power converter and controller 7 can direct the energy to either element individually or in any combination.

In a fifth mode of operation, the vehicle is at rest and connected to an external supply of AC electricity through the charging port 24. The external supply may be the utility electric grid but may also be an off-grid source such as residential solar electricity. The illustration shows a single phase charging port 24. A three phase charging port would be a simple extension requiring the addition of one H-bridge phase leg. During charging, the H-bridge legs associated with the charger port 24 function as an active or passive rectifier delivering power to the DC bus 18, 19. This energy is used primarily to charge the battery 8 but may be supplied to any of the connected subsystems.

In a sixth mode of operation, when the vehicle is at rest and connected to a utility grid, the charger circuitry may deliver energy from the battery 8, fast energy system 9, 26 or engine 3 via MG1 1 to the grid to perform V2G functions.

The fast energy storage device 9, 26 is tolerant of frequent cycling and high power operation while the battery 8 is not. In the second through fourth modes of operation, the power converter and controller 7 directs the flow of energy such that the number of charge and discharge events experienced by the battery 8 is minimized. Additionally, the power converter and controller 7 operates the fast energy storage 9, 26 is operated to minimize the magnitude and extent of high power operation of the battery 8. By protecting the battery 8 from excessive cycling and excessive high power operation, several benefits accrue. The durability of the combined energy storage system is improved compared to using a battery 8 without fast energy storage 9, 26. The battery 8 may be operated over a deeper depth of discharge than would otherwise be possible without the protection of fast energy storage 9, 26. Thus a given all-electric range of travel can be attained with a much smaller battery 8 than would be possible without the protection of fast energy storage 9, 26.

Many other modes are possible where the functions of the five defined modes are used in combination.

Many variations of the invention will occur to those skilled in the art.

The first variation uses the series hybrid configuration from above and uses a fuel cell to generate electricity. The fuel cell replaces the engine 3 and the first motor/generator 1. In this variation, the fast energy storage device 9, 26 and a battery 8 are connected to a power converter and controller 7. The power converter and controller 7 directs the flow of power between the fast energy storage device 9, 26, the battery 8, and the motor/generators 2 and 10. All elements that store or use electricity (3, 7, and 8) may either source or sink electricity. In this variation the fast energy storage device 9, 26 protects the battery 7 from severe or frequent charge and discharge events. Additionally, in this configuration, the fast energy storage device 9, 26 protects the fuel cell by providing immediate power for acceleration where the fuel cell has poor throttle response and could be damaged by such an event.

The second variation incorporates a transmission. In this variation, the transmission may include planetary gears and zero, one, or two clutches. Both MG1 1 and MG2 2 are connected to a transmission that allows parallel mechanical and electrical paths for the transfer of power from the engine for the wheels. This arrangement may be configured as a parallel hybrid or a power split (series parallel) hybrid. In this variation, the power converter and controller 7 perform the same function as it does in the original configuration.

The third variation incorporates a transmission that delivers power from the engine 3 to the wheels. In this variation, MG1 1 is connected to the engine 3 directly or the transmission, MG2 2 is not used, the associated portion of the circuitry in the power converter and controller 7 is not included. This is a parallel hybrid with a single motor. Optionally, MGR 10 and its associated electronics may be included without altering the nature of this variation. In this variation, the power converter and controller 7 performs many of the same function as it does for the original configuration.

The fourth variation is a two-wheel drive version of the original configuration and MGR 10 and the associated circuitry in the power converter and controller 7 are not used. Otherwise, in this variation, the power converter and controller 7 performs the same function as it does in the original configuration.

All such variations are intended to be within the scope and spirit of the invention.

Figure 5:
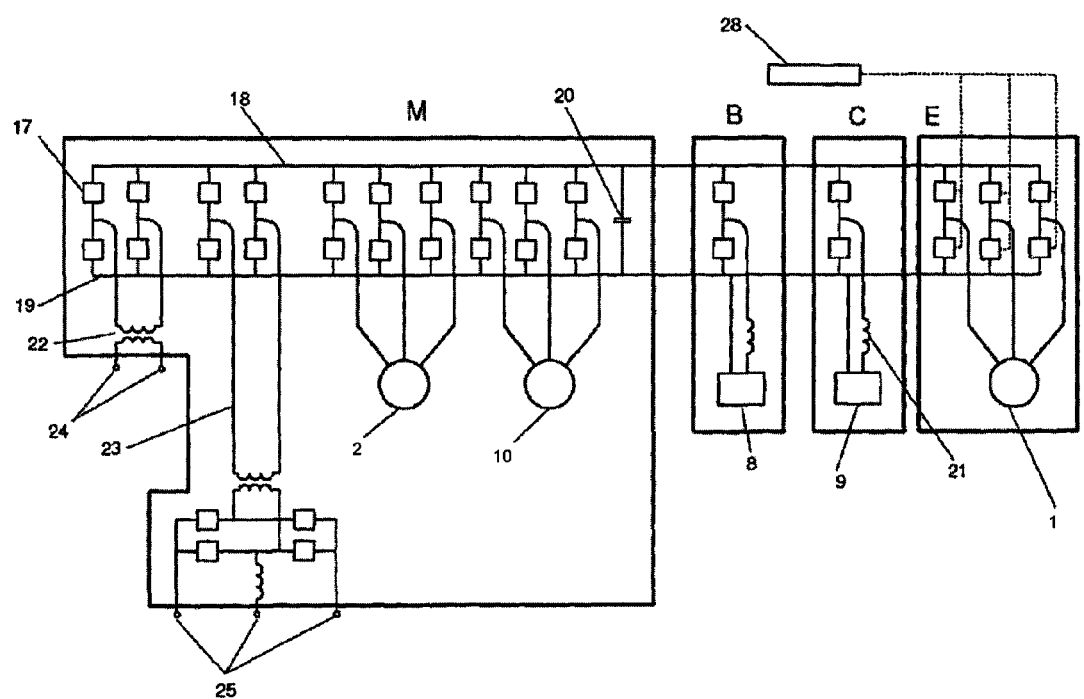
FIG. 5 is a schematic drawing of the power converter and controller showing a functional grouping of the electronics and attached devices for a system using three motor/generators and a capacitor fast energy storage system.

The system shown in FIG. 5 is organized into four subsystems designated M, B, C, and E. Subsystem M comprises all electrical loads supported by the electrical system. These include the traction motors 2, 10 and the DC supply to ancillary equipment 25 such as lights, air conditioning, etc.

Subsystem B refers to the battery 8 and its associated electronics. These electronics may comprise a DC-DC converter, a simple disconnect, or the battery may be directly connected directly to the DC bus.

Subsystem C refers to the fast energy storage system and its associated electronics. FIG. 5 shows fast energy storage implemented as a capacitor or ultracapacitor 9 with a DC-DC converter. Alternatively, the fast energy storage system may be a flywheel device which connects to the DC bus through a motor drive.

Subsystem E refers to the engine, first motor-generator 1, and the motor drive electronics that connect the motor to the DC bus.

Figure 6:
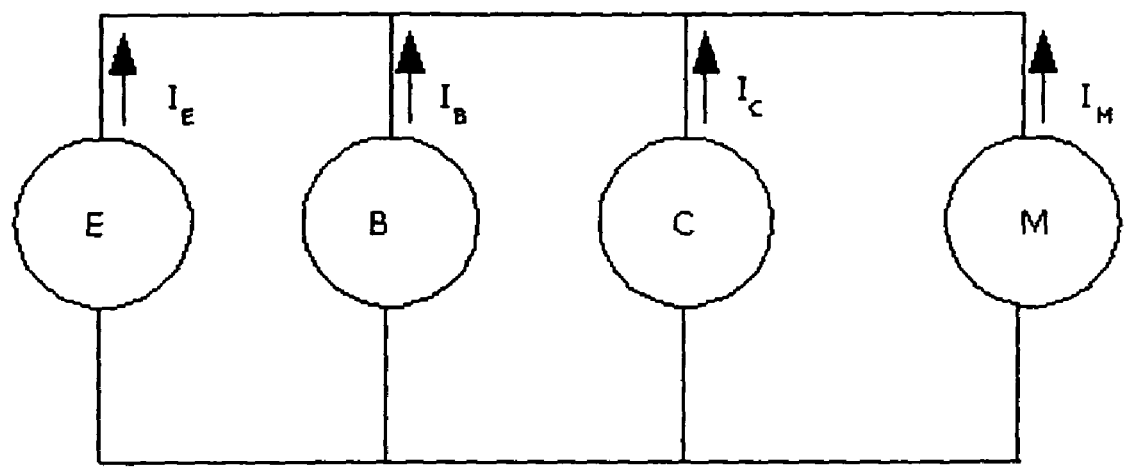
FIG. 6—Subsystem Schematic: shows elements of the drivetrain and power electronics organized by subsystem.

FIG. 6 shows subsystems E, B, C, and M in a one-line schematic diagram. Each subsystem sources or sinks current to the DC bus. Subsystem M primarily demands current from the bus but may also deposit current on the bus during regenerative braking. M-current is established by vehicle operation and performance demands and is an independent parameter. The invention is a method of control whereby subsystems E, B, and C satisfy the current demand I(M) while maximizing efficiency and protecting the battery from operation that may reduce life or result in damage.

Nomenclature for current is as follows

SOC refers to State of Charge;

I(E) is current from MG1 which is driven by the engine;

I(B) is battery current;

I(C) is current for the fast energy storage system;

I(M) is current for the load;

I(BL), I(BU), I(CL), I(CU) are upper and lower current setpoints for the battery and fast energy storage system.

Regarding sign convention,

I(B), I(C)>0 during charging, I(B), I(C)<0 during discharge;

I(E)>0 during engine braking, I(E)<0 during generation;

I(M)>0 when sourcing power with regeneration, I(M)<0 when sinking power under load.

Battery Operating Space

Figure 7:
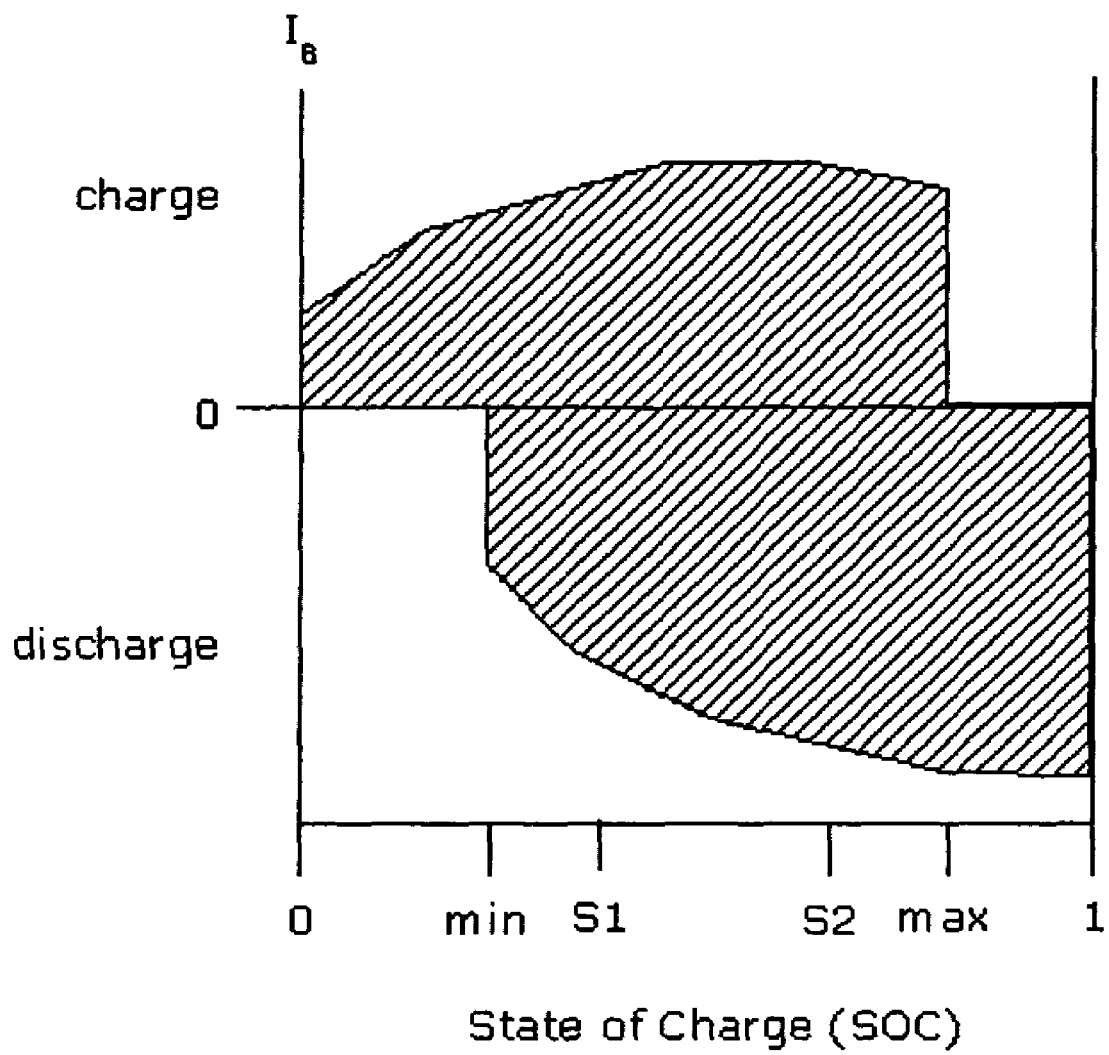
FIG. 7—Battery Operating Space: shows a representative map of allowable battery current as a function of state of charge.

The battery has an allowable current that is a function of state of charge and whether the battery is charging or discharging. FIG. 7 shows a map of allowable battery operation. Many other variants of a map of battery operating space may be implemented. The shape of the allowable range of operation is illustrative and is not restrictive. This map may be implemented as a lookup table or other algorithms. A family of such table may be implemented. When current demand exceeds allowable current for the battery, current is restricted. They way in which current is restricted is a function of how the current demand exceeds allowable current.

Referring to FIG. 7, during discharge, further discharge below SOC(min) is not allowed. During discharge, for SOC>SOC(min), current is limited so that the maximum discharge current is less than or equal to the maximum allowed current at the particular SOC.

During charging, charging above SOC(max) is not allowed. During charging where SOC<SOC(max), current is limited so that the maximum charge current is less than or equal to the maximum allowed charge current.

System States

Figure 8:
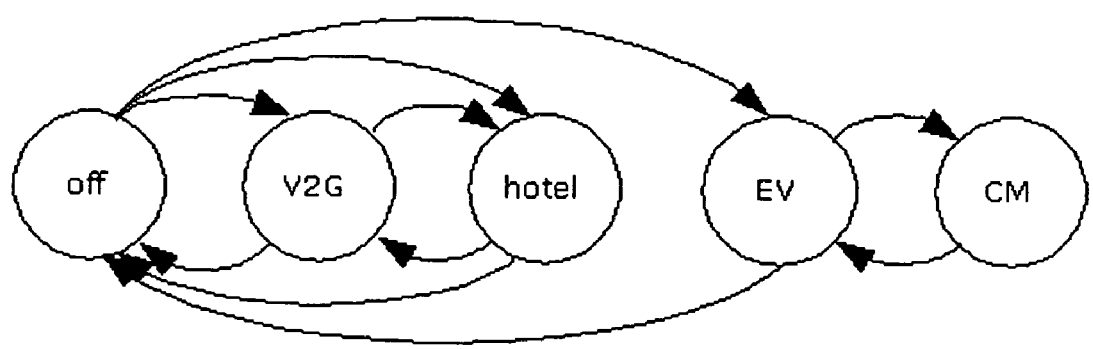
FIG. 8—Vehicle States: is a diagram of several possible vehicle states showing possible transitions between states.

FIG. 8 shows that the system will have a number of different states. Five states are depicted here although this is not restrictive and a number of other states may be implemented. The five states disclosed here are:

Off—Vehicle parked and all systems are turned off.

V2G—(Vehicle to Grid) Vehicle is connected to the grid for charging or to provide services to the grid.

Hotel—Vehicle is parked but power is supplied in order to operate ancillary systems.

EV—(Electric Vehicle) Vehicle is operating as an electric vehicle, the engine is turned off except when needed to provide peak power.

CM—(Charge Mode) Vehicle is operating with the engine turned on in order to charge the battery.

State transitions between off, V2G, and hotel are generally accomplished manually, with driver input. The transition between EV and CM is accomplished automatically while the vehicle is operation. In addition to these states and the various control modes that are disclosed subsequently, a number of other states are implemented. These other states and modes pertain to system and device protection and involve responses to electrical faults, undervoltage and overvoltage conditions, and overcurrent conditions.

The intent of CM is to use the engine to recharge the battery when the battery is at a low state of charge. The transition between states EV and CM is done in a way that minimizes the number of times the engine must turn on. This can be accomplished by using lower and upper setpoints for battery state of charge. FIG. 7 designates these setpoints S1 and S2, respectively. Upon discharging to the lower setpoint, the engine is turned on and charges the battery until the upper setpoint is reached.

Figure 9:
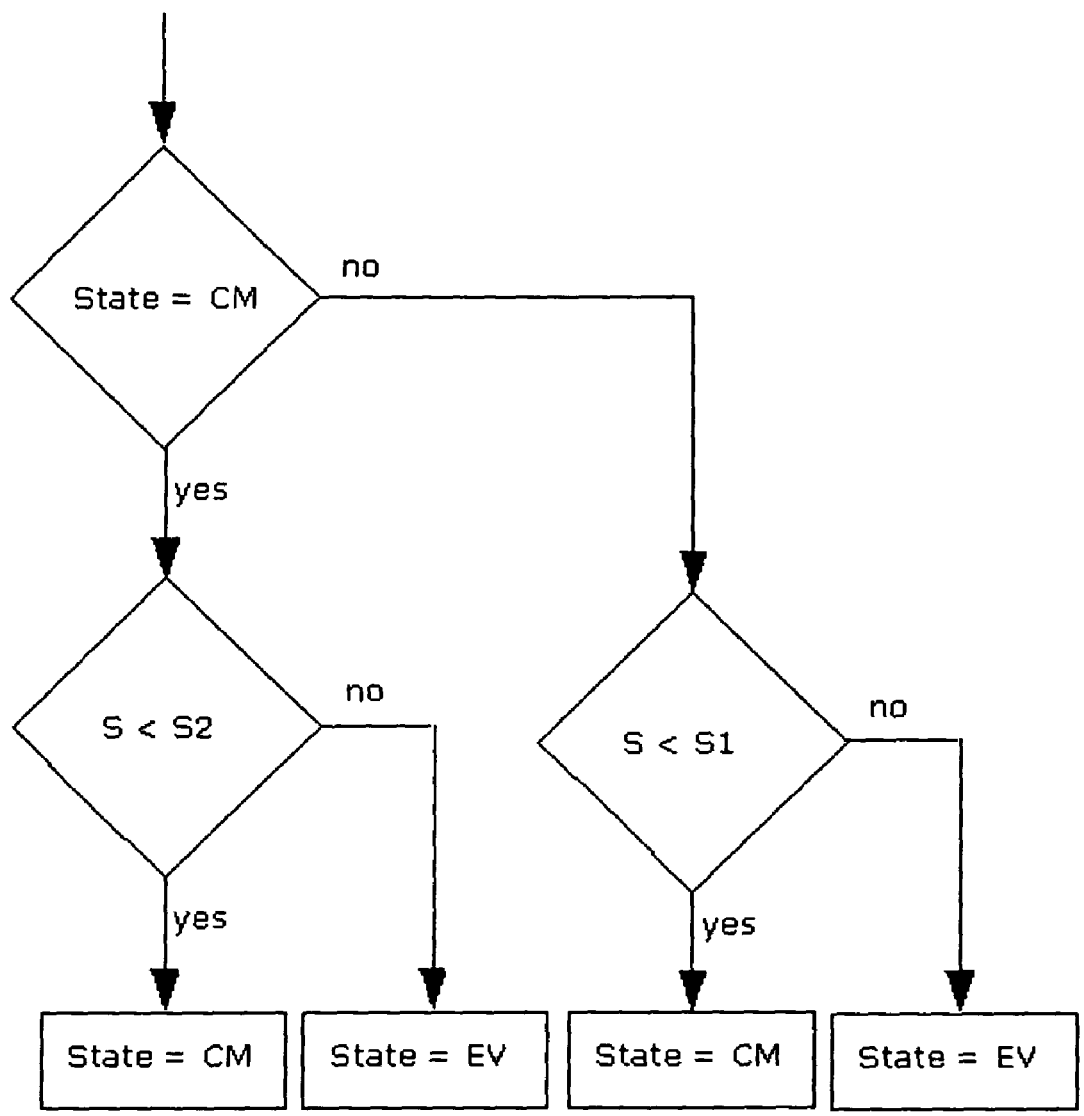
FIG. 9—Logic for State Transition: shows the logic that is used to determine the transition between the two main driving states.

FIG. 9 shows the logic for managing the transition between state EV and state CM. In operation, this state transition logic is evaluated frequently.

The invention is an implementation of either one of two distinct classes of control strategy. The first method of control is designated T1 (Type 1) and uses a DC-DC converter or other electronics to directly control the current of the battery.

The second method of control is designated T2 (Type 2) and is based on a configuration where the battery is connected to the DC bus and may float.

In either case, current I(M) is an independent parameter established by the driving loads and accessory loads. The energy management system supplies the demanded current from the battery, fast energy storage system, and the engine.

Control Method Type 1 (T1)

Figure 10:
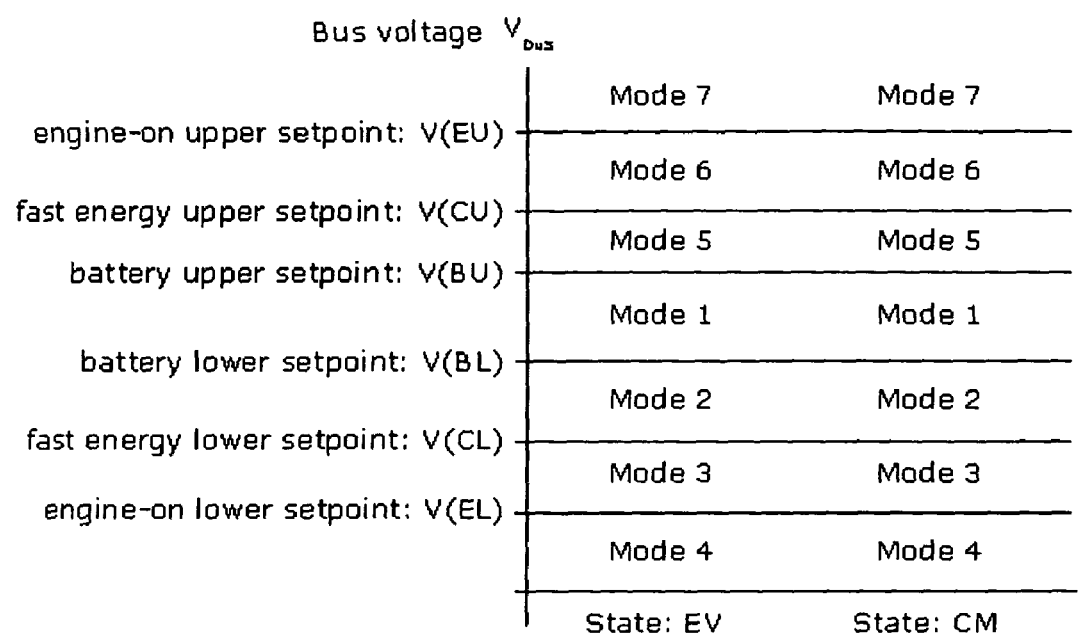
FIG. 10—Voltage Ranges: shows a diagram of voltage ranges that are used in determining operating modes the Type 1 Method of Control.

In a preferred embodiment, operation in EV state uses tiered voltage regulation. FIG. 10 shows a number of voltage ranges that may be used to implement this method. There are several control modes for each system state. The particular control mode is selected on the basis of system state and bus voltage.

Type 1 Control, Machine State: EV

T1-EV1 (Type 1 Voltage regulation, EV mode #1): For V(BU)>V.sub.BUS>V(BL), the bus voltage is between upper and lower limits of a deadband range for battery current. Under this condition, the converters for the battery and fast energy storage system are not operated and the bus voltage is allowed to float. This condition of no net load may occur during vehicle operation when mild regenerative braking offsets vehicle accessory loads and as a result, there is no net demand for power. This mode will also occur during transitions between acceleration and braking.

T1-EV2: For V(BL)>V.sub.BUS>V(CL), a load exists on the bus causing bus voltage to drop until the voltage equals or drops below V(BL). Under this condition, the battery power converter extracts current from the battery and deposits current on the DC bus in order to regulate bus voltage at V(BL). Operation in this mode continues until either voltage returns to V(BU)>V.sub.BUS>V(BL) or allowable operation of the battery as illustrated in FIG. 7 is exceeded. In the former case, the system is operated in EV Mode 1. In the latter case, battery output is insufficient to for the controller to regulate bus voltage at V(BL) and bus voltage drops until it reaches V(CL).

T1-EV3: For V(CL)>V.sub.BUS>V(EL), battery output is insufficient to provide the energy demanded by the vehicle and the fast energy storage system regulates bus voltage. Under this condition, the battery is either disconnected or providing energy to the bus under current regulation. The power converter for the fast energy system regulates bus voltage at a value of V(CL) until one of two conditions arise. (1) The load drops, battery current is sufficient to provide the required power and the system returns to EV Mode 2. (2) The fast energy storage system is depleted and bus voltage drops below V(EL).

T1-EV4: For V(EL)>V.sub.BUS, the battery and the fast energy storage system are not providing sufficient current to maintain a bus voltage at or above V(CL). Under this condition, the engine is turned on so that MG1 will provide peaking power.

Preferentially, the engine will be operated to optimize thermal efficiency. Peak efficiency typically occurs when the engine is operated under load so that engine torque is more than half of full torque. In order to operate the engine under load, under some conditions, MG1 will produce more output than is required to provide peak current. In this event, engine output may be reduced so that the engine produces only the needed current or the system state may transition from EV to CM.

If the combination of I(B)+I(C)+I(E) is insufficient to maintain V(EL), then bus voltage drops reducing power delivered to the load.

T1-EV5: For V(CU)>V.sub.BUS>V(BU), Energy deposited on the bus such as through regenerative braking causes the bus voltage to rise so that it reaches or exceeds V(BU). Under this condition, the battery power converter extracts power from the DC bus in order to regulate the voltage at V(BU). The energy extracted from the bus is used to charge the battery. Operation in this mode continues until either voltage returns to V(BU)>V.sub.BUS>V(BL) or allowable operation of the battery as illustrated in FIG. 7 is exceeded. In the former case, the system is operated in EV Mode 1. In the latter case, battery charging is insufficient for the controller to regulate bus voltage at V(BU), battery charging is current limited, and bus voltage rises until it reaches V(CU).

T1-EV6: For V(EU)>V.sub.BUS>V(CU), battery charge acceptance is regulated according to the battery performance map shown in FIG. 7. This regulated battery charge acceptance is insufficient to maintain the bus voltage below V(CU). The power converter for the fast energy system regulates bus voltage at a value of V(CU) until one of two conditions arise. (1) The charging current drops, battery charge acceptance is sufficient to absorb the required power and the system returns to EV Mode 5. (2) The fast energy storage system is fully charged, fast energy current is reduced, and bus voltage increases above V(CU) reaching V(EU). This results in a transition to EV mode 7.

T1-EV7: For V.sub.BUS>V(EU), the battery and fast energy storage have charge acceptance rates that are insufficient to prevent V(B) from increasing above V(EU). In this mode, the MG1 functions as a motor in order to use the engine for engine braking. MG1 sinks current firom the DC bus in order to reduce V(B) to V(EU).

Type 1 Control, Machine State: CM

In machine state CM, the engine is on and MG1 is sourcing current to the DC bus. Preferentially, the engine is operating at high efficiency.

T1-CM1 (voltage regulation type 1, charge mode 1): T1-CM1 is similar to T1-EV1 in that bus voltage is within a deadband where V(BU)>V.sub.BUS>V(BL). In this condition, the converters for the battery and fast energy storage system are not operated and the bus voltage is allowed to float. This condition of no net load may occur during vehicle operation when current demand I(M)=I(E) and as a result there is no net demand for power beyond power that being supplied by the engine.

T1-CM2: For V(BL)>V.sub.BUS>V(CL), a current demand on the bus exceeds the available current from the engine, |I(M)|>|I(E)|, causing bus voltage to drop until the voltage equals or drops below V(BL). Under this condition, the battery power converter extracts current from the battery and deposits current on the DC bus in order to regulate bus voltage at V(BL). Operation in this mode continues until either voltage returns to V(BU)>V.sub.BUS>V(BL) or allowable operation of the battery as illustrated in FIG. 7 is exceeded. In the former case, the system is operated in CM Mode 1. In the latter case, battery output is insufficient to for the controller to regulate bus voltage at V(BL), the battery sources power under current control, and bus voltage drops until it reaches V(CL).

T1-CM3: For V(CL)>V.sub.BUS>V(EL), battery and engine output are insufficient to provide the energy demanded by the vehicle and the fast energy storage system regulates bus voltage. Under this condition, the battery is either disconnected or providing energy to the bus under current regulation. The power converter for the fast energy system regulates bus voltage at a value of V(CL) until one of two conditions arise. (1) The load drops, battery and engine current are sufficient to provide the required power and the system returns to CM Mode 2. (2) The fast energy storage system is depleted and bus voltage drops below V(EL).

T1-CM4: For $V(EL)>V.sub.BUS$, the engine, battery, and the fast energy storage system are not providing sufficient current to maintain a bus voltage at or above $V(CL)$. Under this condition, bus voltage drops, reducing power to the load.

T1-CM5: For $V(CU)>V.sub.BUS>V(BU)$, a net surplus current $I(E)>I(M)$ causes the bus voltage to rise so that it reaches or exceeds $V(BU)$. Under this condition, the battery power converter extracts power from the DC bus in order to regulate the voltage at $V(BU)$. The energy extracted from the bus is used to charge the battery. Mode T1-CM5 is the normal operating condition for a vehicle operating under steady, moderate load such as freeway driving. Operation in this mode continues until either voltage returns to $V(BU) > V.sub.BUS > V(BL)$ or allowable operation of the battery as illustrated in FIG. 7 is exceeded. In the former case, the system is operated in CM Mode 1. In the latter case, battery charging is insufficient for the controller to regulate bus voltage at $V(BU)$ and bus voltage rises until it reaches $V(CU)$.

T1-CM6: For $V.sub.BUS=V(CU)$, battery charge acceptance is regulated according to the battery performance map shown in FIG. 7. This regulated battery charge acceptance is insufficient to maintain the bus voltage below $V(CU)$. The power converter for the fast energy system regulates bus voltage at a value of $V(CU)$ until one of two conditions arise. (1) The charging current drops, battery charge acceptance is sufficient to absorb the required power and the system returns to CM Mode 5. (2) The fast energy storage system is fully charged, fast energy current is reduced, and bus voltage increases above $V(CL)$. This results in a transition to CM mode 7.

T1-CM7: For $V.sub.BUS>V(CU)$, the battery and fast energy storage have charge acceptance rates that are insufficient to prevent $V(B)$ from increasing above $V(CU)$. In this mode, the MG1 functions as a motor in order to use the engine for engine braking. MG1 sinks current from the DC bus in order to reduce $V(B)$ to $V(CU)$.

Control Method Type 2 (T2)

An alternative to tiered voltage regulation is disclosed for a battery connected directly to the DC bus. In this case, battery current is a function of the state of charge of the battery, bus voltage, and battery impedance. The principle of operation remains that the system will provide the energy source or sink required by the vehicle while maintaining the battery within a defined operating space (FIG. 7). This method differs from Control Method Type 1 in that the mode is selected on the basis of current rather than voltage.

As previously, there are two system states: EV and CM (FIG. 8). As previously, the transition between states is managed primarily by state transition logic (FIG. 9).

Figure 11:
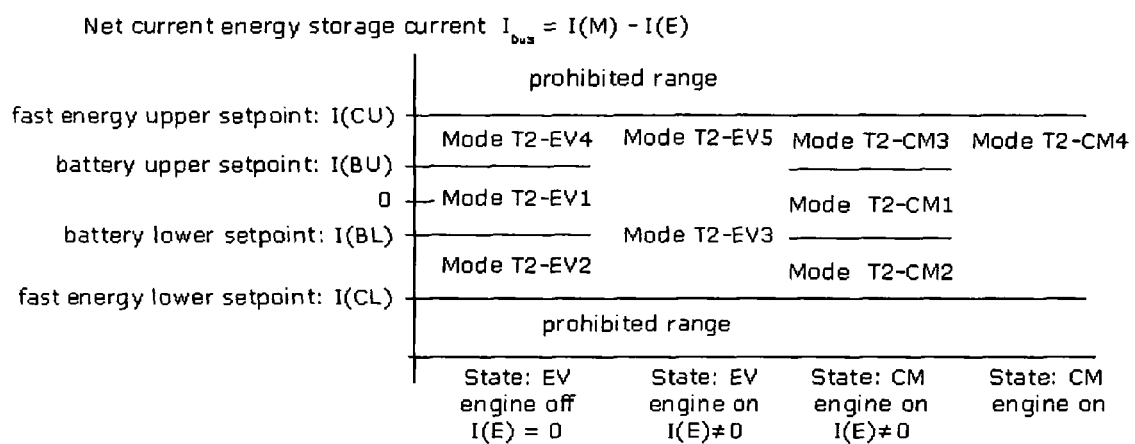
FIG. 11—Current Ranges: shows a diagram of current ranges that are used in determining operating modes for the Type 2 Method of Control.

Control method T2 is implemented by monitoring $I(M)$ and $I(B)$. Fast energy current, $I(C)$, and engine-produced current, $I(E)$, are adjusted to satisfy the demand and maintain $I(B)$ within allowable limits. FIG. 11 shows current ranges and system states used to determine the assignment of control modes. The current values used as setpoints are $I(BU)$, $I(BL)$, $I(CU)$, and $I(CL)$. These values are dynamic and are updated frequently. $I(BU)$ and $I(BL)$ are established to assure that battery operation remains within allowable limits as defined in FIG. 7. $I(CU)$ and $I(CL)$ depend on the state of charge of the fast energy system.

Generally, $I(BU)>0$ and $I(BL)<0$. Under extremes of operation, examples of the range of possible values for $I(BL)$ and $I(CL)$ include but are not limited to the following. When the battery is depleted and has no ability to source current then $I(BL)$ is set to $I(BL)=0$. When the battery is fully charged and has no ability to sink power, then $I(BU)=0$. When the fast energy storage device is depleted and has no ability to source power, $I(CL)$ is set to $I(CL)=I(BL)$. When the fast energy storage device is fully charged and has no charge acceptance capacity, $I(CU)=I(BU)$.

An important principle of the invention is that $I(BL)$, $I(BU)$, $I(CL)$, $I(CU)$, $I(M)$, and $I(E)$ are always known and that information of these current values along with state information such as fault conditions are sufficient to enable control of $I(C)$, $I(B)$, and $I(E)$ or to enter a protective mode.

Type 2 Control, Machine State: EV

T2-EV1: In this mode, the engine is off or idling, $I(E)=0$, and $I(BU)>I(M)>I(BL)$. Current to the load is provided entirely by the battery or current produced regeneratively by the load is absorbed entirely by the battery. Therefore $I(B)=I(M)$. This mode is the default mode for state EV and is allowed to persist provided that $I(B)$ remains within the range of allowable battery current established by $I(BU)>I(B)>I(BL)$ where $I(BU)$ and $I(BL)$ are derived from FIG. 4.

T2-EV2: In this mode, the engine is off or idling, $I(E)=0$, and $I(BL)>I(M)>I(CL)$. During discharge, current reaches the limit $I(BL)$ which is established per the battery current map (FIG. 7). The fast energy system sources current to the DC bus to keep battery current within the allowable limit. As conditions change, if $I(BU)>I(M)>I(BL)$, then the vehicle returns to state T2-EV1. If the fast energy storage system becomes depleted or if $I(M)<0$ and $|I(M)|>|I(BL)+I(CL)|$, then the system transitions to mode T2-EV3.

T2-EV3: In T2-EV3, the engine is turned on and MG1 deposits current on the DC bus. The current deposited by the engine may be sufficient to meet demand while producing a surplus sufficient to charge the battery and fast energy storage system. The system remains in mode T2-EV3 until one of the following conditions is met. In the event that $I(M)<0$ and $|I(M)|>|I(E)+I(BL)+I(CL)|$, then the system executes a protective mode and demand is reduced. If conditions change such that $I(BU)>I(M)>I(BL)$, the mode reverts to T2-EV1. If conditions change such that $I(BL)>I(M)>I(CL)$, the mode reverts to T2-EV1. In event that the duration of operation in this mode is brief, then engine may be allowed to operate in idling or other low power output for a specified amount of time in order to avoid excessive engine start-stop cycles.

T2-EV4: In this mode, the engine is off or idling, $I(E)=0$, and $I(CU)>I(M)>I(BU)$. During regenerative braking, current is deposited on the DC bus in excess of the current limit, $I(BU)$. The fast energy system sinks surplus current. If $I(M)>I(BU)+I(CU)$, then the system transitions into T2-EV5. Otherwise, T2-EV4 persists until $I(BU)>I(M)>I(BL)$, when the vehicle returns to state T2-EV1.

T2-EV5: In this mode, the engine is on and is used for engine braking, $I(E).noteq.0$, and $I(M)>I(BU)+I(CU)$. Engine braking is used to sink the excess current. As $I(M)$ decreases, the system will transition to T2-EV1 or T2-EV4. If $I(M)>I(E)+I(BL)+I(CL)$, then the system executes a protective mode and current deposited on the DC bus is reduced.

Type 2 Control, Machine State: CM

In machine state CM, the engine is on and MG1 is sourcing current to the DC bus.

T2-CM1: The engine is on and sourcing current to the DC bus, $I(E)<0$. Current levels are such that $I(BU)>[I(M)-I(E)]>I(BL)$. Since net current is within the allowable range for the battery, the fast energy storage system neither sources nor sinks power, $I(C)=0$. Therefore $I(B)+I(E)=I(M)$. Under conditions where $0>I(E)$ and $|I(E)|>|I(M)|$, then battery charging occurs. In addition, current may be produced regeneratively so that both $I(M)$ and $I(E)$ contribute to battery charging. This mode is the default mode for state CM and is allowed to persist provided that $I(B)$ remains within the range of allowable battery current given by $I(BU)>[I(M)-I(E)]>I(BL)$.

T2-CM2: The engine is on and sourcing current to the DC bus, $I(E)<0$, and the system is under load, $I(M)<0$. Demand is high and $I(BL)>[I(M)-I(E)]>I(CL)$. In this condition, the fast energy storage system sources current to the DC bus. If current demand decreases and $I(BU)>[I(M)-I(E)]>I(BL)$, then the system transitions to T2-EV1. If current demand exceeds the ability of the combined energy storage devices to meet the load, $I(CL)>[I(M)-I(E)]$, then the system enters a protective mode and reduces demand.

T2-CM3: The engine is on and sourcing current to the DC bus, engine current and regenerative braking source more current in excess of battery capacity so that $I(CU)>[I(M)-I(E)]>I(BU)$. The fast energy storage system sources current in excess of $I(BU)$. If current deposited decreases and $I(BU)>[I(M)-I(E)]>I(BL)$, then the system transitions to T2-CM1. If current sourced to the bus exceeds the capacity of the battery and fast energy storage, $[I(M)-I(E)]>I(CU)$, then the system transitions to T2-CM4.

T2-CM4: In this mode, the engine is on and is idling or used for engine braking, $[I(M)-I(E)]>I(CU)$, and $I(E)$ is established to absorb excess current through engine braking. Should $I(M)$ decrease, the system transitions to T2-CM3 or T2-CM1. If $I(M)>I(E)+I(BL)+I(CL)$, then the system executes a protective mode and current deposited on the DC bus is reduced.

The preceding sections disclosed and described methods of control designated Type 1 and Type 2. In addition to these methods of system control, there are additional methods of control for the fast energy storage device and the engine that may be used in either Type 1 or Type 2 system control. All such variations are intended to be within the spirit and scope of the invention.

Fast Energy Storage: SOC Management

In order to minimize cost and weight of the resulting vehicle, only a minimal amount of fast energy storage is used. The fast energy storage system will have a capacity that is much smaller than that of the battery. In order to make best use of this small capacity, a method of managing the state of charge of the fast energy storage device is implemented.

For this method, under conditions where Type 1 and Type 2 control would set $I(C)=0$, a small charge or discharge current will be applied in order to maintain the fast energy storage system at a target SOC under quiescent conditions. For a vehicle, this target SOC should be high enough so that the device stores sufficient energy for high current events, but low enough so that there is available charge acceptance capacity for regenerative braking. Typical values for this target SOC are 50%-80% of full charge although the exact value may fall outside of this range.

When the fast energy storage SOC is above this target, trickle discharge is implemented. When the fast energy storage SOC is below this target, trickle charge is implemented. In either case, the trickle current is set to be a small value in order to avoid excessive cycling or perturbing the vehicle system controller significantly.

This method of fast energy SOC management may be applied to certain modes within Type 1 and Type 2 control methods with no change to the principle of operation. Referring to the descriptions of Type 1 and Type 2 control, management of fast energy SOC may be applied in the following modes: T1-EV1, T1-EV2, T1-EV5, T1-CM1, T1-CM2, T1-CM5, T2-EV1, T2-EV3, T2-CM1, and T2-CM4.

Engine Control

The methods of control disclosed herein pertain primarily to the operation of power electronics in a hybrid vehicle. In addition, the control method specifies parameters of engine operation. Depending on the type of control, system state, and control mode, the engine may be commanded to perform a number of functions. These commands include but are not limited to the following:

Stop: The engine is commanded to stop.

Start: The engine is commanded to start. If MG1 1 is used to start the engine 3, then engine start must be implemented so that there is sufficient charge in the battery or fast energy storage device to perform this function and that there is sufficient current capacity available from the battery or fast energy storage system to perform this function. If a separate battery and starter motor are used, engine start must be timed so that after a lag associated with the starting operation, engine output will be available when required by one of the control modes.

Peak Efficiency: While an engine may operate over a wide range of torque and speed, peak efficiency is attained under much more narrow range of torque and speed. In response to a command to operate at peak efficiency, throttle setting and torque applied on the engine 3 by MG1 1 will be set so that the engine 3 operates at peak efficiency. Alternatively, instead of a throttle setting, a speed setting may be established.

Idle: In order to avoid excessive engine start-stop cycles, the engine may be commanded to operate at minimal speed with no applied torque.

Load Follow: Most modes of operation use the energy storage systems to manage differences between load and engine output. In the event that the energy storage systems are impaired, engine output may follow the load. In this mode, the plug-in hybrid drivetrain functions like a conventional vehicle with MG 1, MG 2, MGR, and the power converter and controller taking the place of the transmission.

Engine Baking: Several modes of operation involve charging current on the DC bus in excess of the charge acceptance capability of the battery and fast energy storage system. In these modes, MG1 1 functions as a motor applying torque to the engine 3. The engine is operated with a closed throttle, no spark, or other condition so that the engine applies a braking torque to MG1.

All such variations are intended to be within the scope and spirit of the invention.

What is claimed is:

1. A system for powering a plug-in hybrid electric vehicle comprising a vehicle drivetrain having an internal combustion engine and one or more motor-generators connected to the drivetrain, wherein the one or more motor-generators supply power to the drivetrain to propel the vehicle or start the engine or absorb power to regeneratively recharge one or more energy storage devices; said system comprising a first electrical energy storage device; a second electrical energy storage device; and power electronics;

wherein the first electrical energy storage is a battery that delivers electrical energy to the drivetrain for traction power or to start the engine, or absorbs electrical energy from the drivetrain;

wherein the second electrical energy storage device is a flywheel, capacitor, ultracapacitor, supercapacitor, or battery; and the second electrical energy storage device only absorbs or delivers current as necessary to protect the first electrical energy storage device from current above a damage threshold for the first electrical energy storage device; and wherein the power electronics include a polyphase power converter with a plurality of phase legs, wherein each phase leg comprises two electronic switches with diodes; wherein both ends of each phase leg are connected to a DC bus; wherein a center of each phase leg is connected to another electrical device; wherein one or more capacitors are connected across the DC bus; wherein a first of said plurality of phase legs is used as a DC-DC converter for the second electrical energy storage device; and wherein one or more sets of three phase legs from the power converter function as one or more three phase motor drives.

2. The system set forth in claim 1 configured so that the first electrical energy storage device is connected directly to the DC bus.

3. The system set forth in claim 1 configured so that the second electrical energy storage device is a capacitor that is connected to the DC bus through the DC-DC converter.

4. The system set forth in claim 1 configured so that the second electrical energy storage device is a battery that is connected to the DC bus through the DC-DC converter.

5. The system set forth in claim 1 configured so that phase legs are used as a charger for either or both of the first electrical energy storage device and the second electrical energy storage device.

6. The system set forth in claim 1 configured so that the DC-DC converter uses inductance of connected motors and transformers to smooth current ripple.

7. The system set forth in claim 1 configured with a single motor connected to the drivetrain.

8. The system set forth in claim 1 configured as a series hybrid with two or more motor-generators.

9. The system set forth in claim 1 configured with separate front and rear drive, where the front drive and rear drive are not mechanically connected to one another via an axle or shaft.

10. The system set forth in claim 1 configured with engine powered front wheel drive and motor-generator powered rear wheel drive.

11. The system set forth in claim 1 configured with DC output ports that provide power to vehicle equipment and subsystems.

12. The system set forth in claim 1 configured with an AC charging port and an active rectifier that supplies charging power to the DC bus.

13. The system set forth in claim 1 configured with a separate battery charger for the first electrical energy storage device.

14. The system set forth in claim 1 including a control algorithm hosted by a microprocessor or a digital signal processor.

15. The system set forth in claim 1 configured where the DC-DC converter is a single phase leg having a single-phase.

16. The system set forth in claim 1 configured with phase legs connected as an active rectifier that produce AC voltage which is transformed to lower or higher voltage and rectified to DC.

17. The system set forth in claim 1 configured so that the second electrical energy storage device is connected directly to the DC bus.

* * * * *